United States Patent
Uvnäs (10) Patent No.: US 9,366,565 B2
(45) Date of Patent: Jun. 14, 2016

(54) LIGHT OUT-COUPLING ARRANGEMENT AND A TOUCH SENSITIVE SYSTEM COMPRISING THE OUT-COUPLING ARRANGEMENT

(71) Applicant: FlatFrog Laboratories AB, Lund (SE)

(72) Inventor: Krister Uvnäs, Lund (SE)

(73) Assignee: FlatFrog Laboratories AB, Lund (SE)

( * ) Notice: Subject to any disclaimer, the term of this patent is extended or adjusted under 35 U.S.C. 154(b) by 93 days.

(21) Appl. No.: 14/467,795

(22) Filed: Aug. 25, 2014

(65) Prior Publication Data
US 2015/0053850 A1    Feb. 26, 2015

(30) Foreign Application Priority Data
Aug. 26, 2013 (SE) .................................. 1350975-7

(51) Int. Cl.
| | |
|---|---|
| G02B 6/00 | (2006.01) |
| G01J 1/04 | (2006.01) |
| G06F 3/042 | (2006.01) |
| F21V 8/00 | (2006.01) |

(52) U.S. Cl.
CPC ............. *G01J 1/0425* (2013.01); *G06F 3/0421* (2013.01); *G02B 6/0011* (2013.01); *G06F 2203/04109* (2013.01)

(58) Field of Classification Search
CPC ........ G02B 6/0033; G02B 6/26; G02B 6/262; G06F 3/0421
USPC ......... 250/227.11, 227.14, 227.23; 385/9, 12; 345/173, 175, 176
See application file for complete search history.

(56) References Cited

U.S. PATENT DOCUMENTS

| | | | | |
|---|---|---|---|---|
| 2007/0052684 | A1* | 3/2007 | Gruhlke | G06F 3/0421 345/173 |
| 2007/0125937 | A1* | 6/2007 | Eliasson | G06F 3/0414 250/221 |
| 2007/0152985 | A1 | 7/2007 | Ostergaard et al. | |
| 2011/0176768 | A1 | 7/2011 | Singh et al. | |

FOREIGN PATENT DOCUMENTS

| | | |
|---|---|---|
| WO | WO-2010/056177 A1 | 5/2010 |
| WO | WO-2011/028169 A1 | 3/2011 |

* cited by examiner

*Primary Examiner* — Kevin Pyo
(74) *Attorney, Agent, or Firm* — Harness, Dickey & Pierce, PLC.

(57) ABSTRACT

The disclosure relates to a light out-coupling arrangement for a touch sensitive system comprising a light guide of a material with a refractive index $n_g$ and a top surface configured to be exposed to ambient light, and a bottom surface. The out-coupling arrangement comprises at least one detector arranged along the periphery of the light guide and configured to receive the light propagating in the light guide and an optical filter provided between the light guide and the at least one detector. The optical filter has a first side and a second side where the first side is arranged to face the at least one detector, and the second side is arranged to receive light from the light guide. The optical filter is made of a medium with a refractive index $n_f$ less than the refractive index $n_g$ of the light guide, such that ambient light incident onto the second side at an angle larger than a critical angle $\theta_c$ from a normal of the second side will be reflected on the optical filter by total internal reflection and will not reach the at least one detector. The disclosure also relates to a touch sensitive system comprising a light out-coupling arrangement.

13 Claims, 4 Drawing Sheets

LIGHT OUT-COUPLING ARRANGEMENT AND A TOUCH SENSITIVE SYSTEM COMPRISING THE OUT-COUPLING ARRANGEMENT

CROSS-REFERENCE TO RELATED APPLICATIONS

The present application claims the benefit of Swedish patent application No. 1350975-7, filed 26 Aug. 2013, which is incorporated herein by reference.

FIELD OF THE INVENTION

The present invention relates to an out-coupling arrangement for filtering out ambient light, and use of such an out-coupling arrangement in a touch sensitive system according to the preamble of the independent claims.

BACKGROUND OF THE INVENTION

Touch sensing systems ("touch systems") are in widespread use in a variety of applications. Typically, the touch systems are actuated by a touch object such as a finger or stylus, either in direct contact, or through proximity (i.e. without contact), with a touch surface. Touch systems are for example used as touch pads of laptop computers, in control panels, and as overlays to displays on e.g. hand held devices, such as mobile telephones. A touch panel that is overlaid on or integrated in a display is also denoted a "touch screen". Many other applications are known in the art. To an increasing extent, touch systems are designed to be able to detect two or more touches simultaneously, this capability often being referred to as "multi-touch" in the art.

A number of touch sensing technologies exists, e.g. resistive, surface acoustic wave, capacitive and optical touch sensing technology. WO2011/028169 discloses an example of an optical touch system capable of detecting a plurality of touches. The touch system is based on frustrated total internal reflection (FTIR). Light sheets are coupled into a panel by emitters to propagate inside the panel by total internal reflection (TIR). When an object comes into contact with a touch surface of the panel, the propagating light is attenuated at the point of touch. The transmitted light is measured at a plurality of outcoupling points by one or more light detectors. The signals from the light detectors are processed for input into an image reconstruction algorithm that generates a 2D representation of interaction across the touch surface. This enables repeated determination of current position/size/-shape of touches in the 2D representation while one or more users interact with the touch surface.

To detect touches with high accuracy, the signal to noise ratio of the detected light shall be kept high. One source of noise is ambient light. Ambient light is light originating from sources of light outside the light guide others than the emitters. Ambient light can be removed from the detected light by creating an ambient light profile and subtracting the ambient light profile from the detected light. Another way or complement is to prevent the ambient light to reach the detectors, e.g. with a filter or shield. An example of an ambient filter is illustrated in WO2010056177A1, where a spectral bandpass filter is provided in front of the sensors. The filter is matched to transmit a major portion of the TIR radiation, and to block a major portion of the ambient light.

To provide a touch system with such a filter may be costly and careful placing of the components in relation to the filter is necessary to get the desired protection.

It is thus an object of the invention to provide an alternative out-coupling arrangement to a touch sensitive system that protects the at least one detector from ambient light, and that to at least some extent removes any noted deficiency with prior art.

SUMMARY OF THE INVENTION

According to one aspect, the object is achieved with a light out-coupling arrangement for a touch sensitive system, wherein the touch sensitive system comprises a light guide of a material with a refractive index $n_g$ and a top surface configured to be exposed to ambient light, and a bottom surface. The touch sensitive system further has an in-coupling arrangement comprising at least one emitter arranged along the periphery of the light guide and is configured to emit light into the light guide whereby the light propagates in the light guide via total internal reflection (TIR). The out-coupling arrangement comprises at least one detector arranged along the periphery of the light guide and configured to receive the light propagating in the light guide, and an optical filter provided between the light guide and the at least one detector. The optical filter has a first side and a second side where the first side is arranged to face the at least one detector, and the second side is arranged to receive light from the light guide. The optical filter is made of a medium with a refractive index $n_f$ less than the refractive index $n_g$ of the light guide, such that ambient light incident onto the second side at an angle larger than a critical angle $\theta_c$ from a normal of the second side will be reflected on the optical filter by total internal reflection and will not reach the at least one detector.

With such an out-coupling device, at least some of the ambient light can be prevented from reaching the at least one detector. There is no need for another separate ambient light shield that might be costly and need precise alignment with the detector.

TIR is a phenomenon that occurs when the propagating light strikes a boundary between two mediums at an angle to the normal that is larger than a critical angle $\theta_c$ in respect to the normal of the boundary, and the refractive index is lower on the other side of the boundary. The propagating light then cannot pass the boundary, and will by totally internally reflected. This effect is used by the optical filter as will be described in the following.

The angles of the ambient light that are prevented from reaching the detector depends on the refractive indexes of the materials and how the parts of the touch sensitive system are arranged in relation to each other, as will be apparent from the following description.

According to one embodiment, the optical filter is made of a medium with a refractive index between 1 and 1.5. The medium thus has a low refractive index. The medium of the optical filter may be air or a fluid such as water, or a mixture comprising water. According to another embodiment, the optical filter is a tape or a coating. Thus, the optical filter may be easily attached to the detector, and/or to the light guide.

According to one embodiment, the optical filter is arranged to reflect ambient light that is coupled out from the light guide through the lower surface of the light guide. According to another embodiment, the optical filter is arranged to reflect ambient light that is coupled out from the light guide through an edge of the light guide. Thus, light propagating in the light guide may be coupled out from the light guide at various points.

According to one embodiment, the second side of the optical filter is oriented in relation to the light guide such that ambient light incident on the top surface of the light guide is incident on the second side at an angle larger than the critical angle $\theta_c$ from a normal of the second side and thus reflected by total internal reflection. Thus, the ambient light may be guided via e.g. a coupling link from the wave guide to the second side of the optical filter, as long as the ambient light is still incident on the second side at an angle larger than the critical angle $\theta_c$ from a normal of the second side.

For example, the second side of the optical filter is oriented in a direction substantially perpendicular to the top surface of the light guide. According to another example, the second side of the optical filter is oriented with an angle $\theta_4$ to a normal of the top surface of the light guide such that the second side faces away from the light guide. Generally, the lower the refractive index of the filter medium, the larger angles of ambient light incident on the top surface from a normal of the top surface can be totally reflected on the optical filter. This correspondingly means that the lower the refractive index of the filter medium, the smaller angles of ambient light incident on the second side of the optical filter from a normal to the second side can be prevented from reaching the detector by TIR. Thus, a larger angle interval of the ambient light can be prevented from reaching the detector. However, mediums with low refractive indexes may be relatively expensive. If inclining the optical filter, the refractive index of the medium of the optical filter can be kept higher, and the same or larger interval of angles of ambient light incident on the top surface from a normal of the top surface can still be prevented from reaching the detector by total internal reflection. This configuration may reduce the cost of the out-coupling device compared to having lower index refractive mediums.

According to one embodiment, the optical filter has a width between the first side and the second side of at least 1 μm.

According to a second aspect, the object is achieved by a touch sensitive system comprising a light guide having a top surface and a bottom surface, an in-coupling arrangement comprising at least one emitter arranged along the periphery of the light guide and configured to emit light into the light guide whereby the light propagates in the light guide via total internal reflection, TIR. The touch sensitive system further comprises a light out-coupling arrangement according to any of embodiments as described herein.

Preferred embodiments are set forth in the dependent claims and in the detailed description.

SHORT DESCRIPTION OF THE APPENDED DRAWINGS

Below the invention will be described in detail with reference to the appended figures, of which.

DETAILED DESCRIPTION OF PREFERRED EMBODIMENTS OF THE INVENTION

Figure 1:
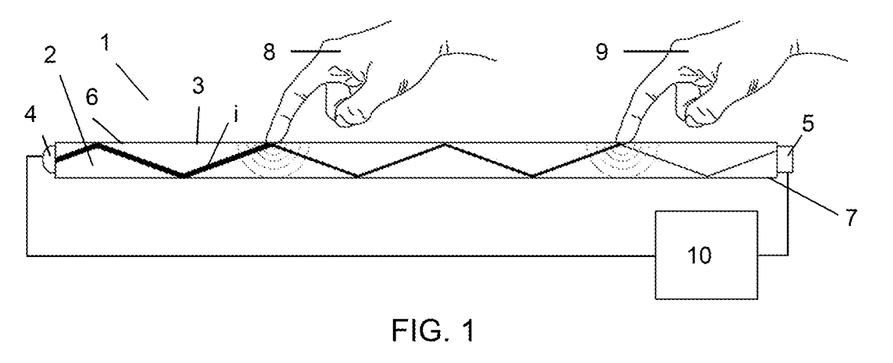
FIG. 1 illustrates a side view of a touch arrangement based on FTIR.
Figure 2:
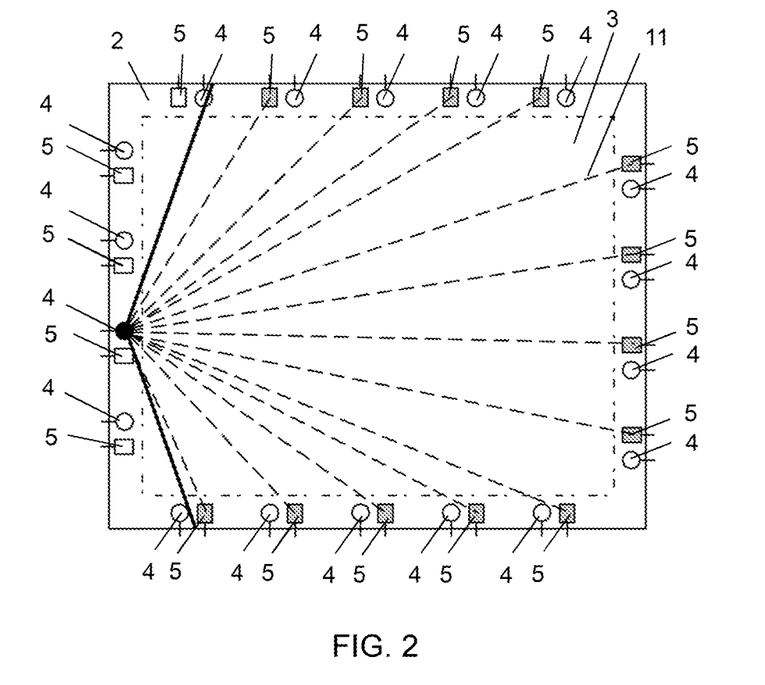
FIG. 2 illustrates a top view of the touch arrangement in FIG. 1.

FIGS. 1 and 2 illustrates a side view and a top view of an example embodiment of a touch arrangement 1 to be used in a touch-sensitive system 16 (FIG. 4) that is based on the concept of FTIR (Frustrated Total Internal Reflection), also denoted "FTIR system". The touch arrangement 1 operates by transmitting light inside a light guide 2, e.g. a panel, from light emitters 4 to light sensors or detectors 5, so as to illuminate a touch surface 3 from within the panel 2. The light guide 2 is made of solid material in one or more layers and may have any shape. The material of the light guide 2 may be e.g. glass or a polymer. The light guide 2 defines an internal radiation propagation channel, in which light propagates by internal reflections. In the example of FIG. 1, the propagation channel is defined between two boundary surfaces 6, 7 of the light guide 2, thus a top surface 6 and a bottom surface 7, where the top surface 6 allows the propagating light to interact with touching objects 8, 9 and thereby defines the touch surface 3. This is achieved by injecting the light into the light guide 2 such that the light is reflected by total internal reflection (TIR) in the touch surface 3 as it propagates through the panel 2. The light may be reflected by TIR in the bottom surface 7 or against a reflective coating thereon. The top surface 6 and the bottom surface 7 are according to one embodiment parallel surfaces. The light guide 2 may further be designed to be overlaid on or integrated into a display device or monitor.

The arrangement 1 allows one or several objects 8, 9 that is brought into close vicinity of, or in contact with, the touch surface 3 to interact with the propagating light at the point of touch. In this interaction, part of the light may be scattered by the object 8, 9, part of the light may be absorbed by the object 8, 9 and part of the light may continue to propagate in its original direction across the light guide 2. Thus, the touching object 8, 9 causes a local frustration of the total internal reflection, which leads to a decrease in the energy (power/intensity) of the transmitted light, as indicated by the thinned lines "i" downstream of the touching objects 8, 9 in FIG. 1. If two objects 8 and 9 happen to be placed after each other along a light path i from an emitter 4 to a detector 5, part of the light will interact with both these objects 8, 9. Provided that the light energy is sufficient, a remainder of the light will interact with both objects 8, 9 and generate an output signal that allows both interactions (touch inputs) to be identified. The output signal is received to a control unit 10 which processes the output signal to detect interaction with the touching object(s) 8, 9.

As illustrated in FIG. 2, the emitters 4 are distributed along the perimeter of the touch surface 3 of the light guide 2. The emitters 4 may be located below the bottom surface 7 and/or at an edge of the light guide 2. An edge of the light guide 2 connects the top surface 6 with the bottom surface 7. The emitters 4 generate a corresponding number of light sheets inside the light guide 2. Each emitter 4 generates a beam of light that expands in the plane of the light guide 2 while propagating in the light guide 2. Each beam propagates from one or more entry or incoupling points on the light guide 2. The detectors 5 are distributed along the perimeter of the touch surface 3 of the panel 2 to receive the light from the emitters 4 at a number of spaced-apart outcoupling points on the panel 2. The detectors 5 may be located below the bottom surface 7 and/or at the edge of the light guide 2. The emitters 4 and detectors 5 are here grouped in couples with one emitter 4 and one detector 5 side by side, but the distribution could be different. For example, two or three emitters 4 located side by side, and two or three detectors 5 located side by side could be alternately distributed along the perimeter of the touch surface 3. A light path from an emitter 4 to a detector 5 is defined as a detection line 11. In the figure the detection lines 11 from one emitter 4 to a plurality of detectors 5 are denoted as dashed lines. The plurality of detectors 5 are shaded to indicate their participation in receiving light at ends of the detection lines 11.

To be able to detect one or several touches with high accuracy, the signal to noise ratio of the light received to the at least one detector 5 should be kept high. In order to remove noise such as ambient light from reaching the detector 5, an optical filter 12 is provided optically between the light guide 2 and the detector 5 as will be described with reference to FIGS. 3A-3C. With optically provided between the light guide 2 and the detector 5 means that light to be received by the detector 5 has to go through the optical filter 12. An active area of the detector 5, sensitive to light, should thus receive the light going through the optical filter 12. The detector 5 can react to and measure light in any suitable wavelength range, e.g. in the infrared, visible or ultraviolet wavelength region and may e.g. be a thermal or photonic detector. Generally, the detector 5 is configured to detect the light emitted from the emitters 4.

One or several detectors 5 together with one or several optical filters 12 together form an out-coupling arrangement 13 of the touch sensitive system 16. The out-coupling arrangement 13 couples out light from the light guide 2.

In FIG. 3A to 3D different examples of the out-coupling arrangement 13 are illustrated. Within the figures, the same reference numerals are used. In the figures the light guide 2 is illustrated together with the out-coupling arrangement 13. The out-coupling arrangement 13 here comprises a detector 5 and the optical filter 12, but the out-coupling arrangement 13 may comprise a plurality of detectors 5 and one or several optical filters 12. However, each detector 5 in the out-coupling arrangement 13 faces the same or different optical filters 12. The optical filter 12 has a first side 20 arranged to face the active area of the detector 5, and a second side 21 arranged to receive light from the light guide. The detector 5 is placed on a printed circuit board, PCB, 18, and the detector 5 is electrically connected to the PCB 18. An optical coupling medium 14, or embedding 14, may embed the detector 5 and the optical filter 12 such that light can propagate unaffected from the light guide 2 to the optical filter 12. The optical coupling media 14 thus provides an optical connection or path between the light guide 2 and the out-coupling arrangement 13. The embedding 14 also protects the detector 5 from dust etc. Instead or in combination, light may be guided in a coupler between the light guide 2 and the second side of the filter device 12.

Most ambient light 22 is incident from the air onto the top surface 6 of the light guide 2, here illustrated with an angle $\theta_1$. The air surrounding the light guide 2 has a refractive index $n_a=1$. The light guide 2 may be made of e.g. glass or a plastic material, and have a refractive index $n_g$ that is equal to e.g. 1.5, thus higher than the refractive index of air. The ambient light 22 will then be refracted into the light guide 2 with an angle $\theta_2$ that can be calculated according to Snell's law:

$$\frac{\sin\theta_1}{\sin\theta_2} = \frac{n_g}{n_a} \quad (1)$$

which gives:

$$\theta_1 = \sin^{-1}\left(\frac{n_g}{n_a} \cdot \sin\theta_2\right) \quad (2)$$

The ambient light 22 will propagate through the light guide 2 and reach the boundary between the light guide 2 and the optical coupling medium 14. The boundary may be the bottom surface 7, or an edge of the light guide 2. In this example, the optical coupling medium 14 has a refractive index $n_m$ that is the same as the refractive index $n_g$ of the light guide 2, thus, the optical coupling medium 14 and the light guide 2 are index matched. The optical coupling medium 14 is further made of an optically transmissive material. The ambient light 22 will then continue to propagate without any deflection in the optical coupling medium 14. Alternatively or in combination, the ambient light 22 can be guided to the optical filter 12 in a coupler.

According to another embodiment, the refractive index $n_m$ of the optical coupling medium 14 may be different from the refractive index $n_g$ of the light guide 2, e.g. larger, such that the ambient light will be refracted into the optical coupling medium 14 with a smaller angle to the normal of the bottom surface 7 than the incident angle of the ambient light to the bottom surface 7.

The ambient light 22 will then be incident on the optical filter 12. The optical filter 12 may thus be arranged to reflect ambient light that is coupled out from the light guide 2 through the lower surface 7 of the light guide 2, through an edge of the light guide 2, or through any other surface of the light guide 2 constituting a boundary surface of the light guide 2. Generally, the second side 21 of the optical filter 12 is oriented in relation to the light guide 2 such that ambient light 22 incident on the top surface 6 of the light guide 2 is incident on the second side 21 at an angle larger than the critical angle $\theta_c$ from a normal of the second side 21. The ambient light 22 will then be reflected on the second side 21 of the optical filter such that the ambient light will not reach the detector 5.

An adhesive may be used to adhere the optical coupling medium 14, the optical filter 12, the detector 5, the PCB 18 and/or any other components such as a coupler etc. to the light guide 2.

Figure 3A:
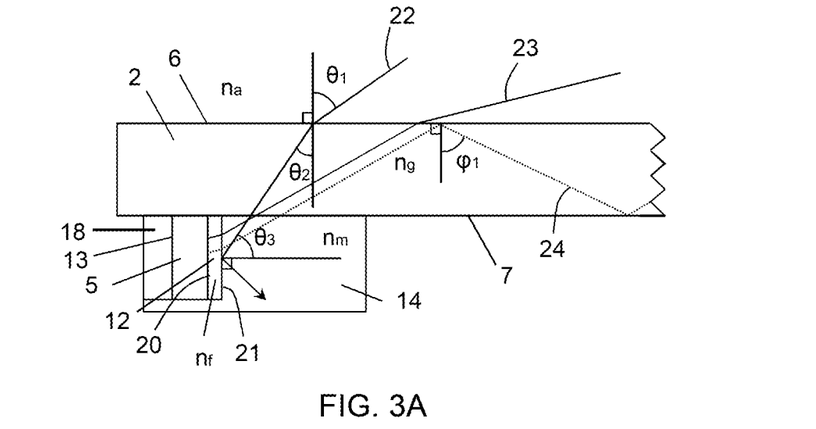
FIG. 3A-3D illustrates side views of out-coupling arrangements according to some embodiment of the invention.

The first and second sides 20, 21 are in the example illustrated in FIG. 3A oriented in a direction substantially perpendicular to the top surface 6 of the light guide 2, that is, parallel to the normal of the top surface 6. It is now desired that the ambient light 22 is reflected via TIR on the second side 21 of the optical filter 12, such that it will not reach the detector 5. The ambient light 22 then has to be incident against the second side 21 of the optical filter 12 at an angle $\theta_3$ to the normal of the second side 21 of the optical filter 12 that is larger than a critical angle $\theta_c$ to the normal of the second side 21. Ambient light with an angle $\theta_3$ larger than the critical angle $\theta_c$ will thus not reach the detector 5. The critical angle $\theta_c$ can be calculated by Snell's law according to equation (1) as follows:

$$\theta_c = \sin^{-1}\left(\frac{n_f}{n_m}\right) \quad (3)$$

where $n_f$ is the refractive index of the medium of the optical filter 12. The refractive index $n_f$ of the medium of the optical filter 12 is less than the refractive index $n_g$ of the light guide 2 and the refractive index $n_m$ of the coupling medium 14. Then ambient light 22 incident onto the second side 21 larger than a critical angle $\theta_c$ from a normal of the second side 21, will be reflected on the optical filter 12 by TIR according to Snell's law (1). The medium of the optical filter 12 is made of a medium with a refractive index between 1 and 1.5, e.g. 1.1, 1.2, 1.3 or 1.4. The medium thus has a low refractive index. The medium of the optical filter 12 may be air or a fluid such as water, or a mixture comprising water. The optical coupling medium 14 may then at least partly define borders of the optical filter 12 to be able to accommodate air or fluid of the optical filter 12. According to another embodiment, the optical filter 12 is a tape or a coating. The coating may e.g. be made of silicon, aerogel or polytetrafluoroethylene (PTFE), also known as Teflon®. According to one embodiment, the optical filter 12 is sprayed onto the detector 5, or the detector 5 is coated with the optical filter 12. For example, physical vapour deposition (PVD) such as thermal vaporisation or sputtering, or chemical vapour deposition (CVD) can be used to deposit the optical filter 12 on the detector 5. The material of the optical filter 12 may be a dielectric material, especially fluorides, oxides, nitrides, carbides or metals and their alloys. The refractive index is according to one embodiment the same in the whole medium of the optical filter 12. According to another embodiment, the optical filter 12 is made of a plurality of layers, i.e. is a multi-layer optical filter 12. The layers may then have different refractive indexes and e.g. be made of different materials.

Figure 3B:
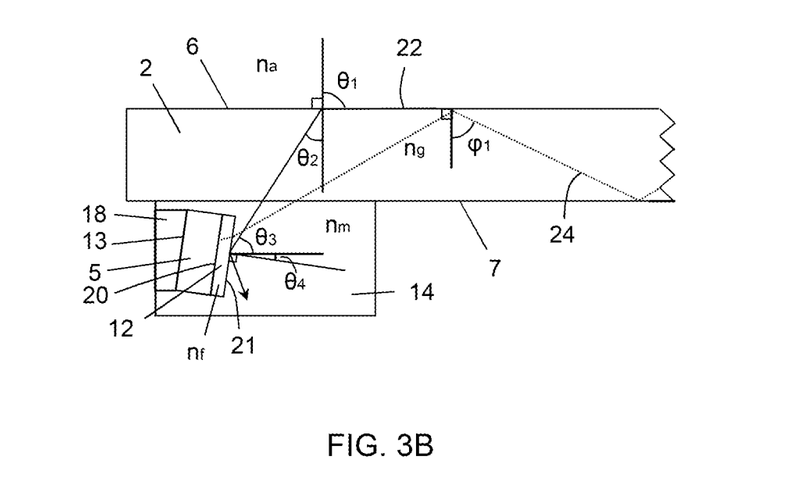
Figure 3C:
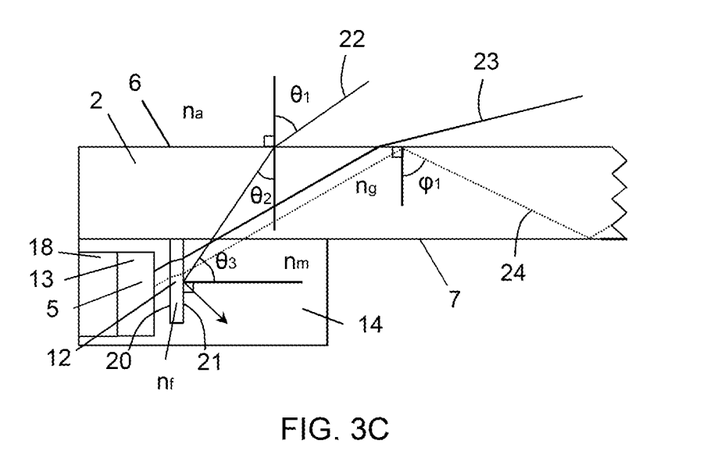

The optical filter 12 may be attached to the detector 5 and/or the light guide 2 with an adhesive. The optical filter 12 may cover an area that is larger than the active area of the detector 5 or detectors 5. The optical filter 12 may e.g. be in the shape of a tape that is taped to the light guide 2. The optical filter 12 has a width between the first side 20 and the second side 21 of the optical filter 12 of at least 1 µm, e.g. 1.2, 1.4, 1.6, 1.8, 2, 2.2, 2.4, 2.6, 2.8 or 3. A width of at least 1 µm is necessary such that no evanescent wave shall reach the detector 5 when the ambient light is reflected by TIR. Evanescent waves are formed when the ambient light strikes the second side 21 at an angle to the normal that is greater than the critical angle $\theta_c$. An evanescent wave has a penetration depth d that depends on the wavelength of the incident light, here the ambient light, the angle of incidence and the refractive indexes of the materials. A penetration depth d representing the distance for which the evanescent field of the evanescent wave decays to 1/e of its peak value can be modelled as:

$$d = \frac{\lambda_0/n_f}{2\pi\left((n_m/n_f \sin\theta)^2 - 1\right)^{1/2}} \quad (4)$$

where $\lambda_0$ is the wavelength of the ambient light, $\theta$ is the angle of incidence (here $\theta_3$ (FIG. 3A, C, or $\theta_3+\theta_4$ (FIG. 3B)) and the refractive indexes of the materials (here $n_f$ and $n_m$). Thus, the width of the optical filter 12 at least has to be greater than the penetration depth d, such that essentially no evanescent wave from the ambient light will reach the detector 5. As understood from the equation (4), the larger the refractive index $n_f$ of the optical filter 12, the larger the penetration depth d, and thus the larger also the width of the optical filter 12 has to be. Thus, by having an optical filter 12 with a low refractive index $n_f$, e.g. between 1-1.4, the optical filter 12 can be made with a smaller width than if the $n_f$ was higher. A smaller width of the optical filter 12 is advantageous as the components described herein, i.e. the optical filter 12, detector 5 etc., are to be embedded in increasingly smaller consumer products where space is limited and weight should be minimized. Further, a smaller width of the optical filter 12 is also advantageous because of the less cost to make the optical filter. However, as will be discussed below, a material with a low refractive index might be expensive. Thus, the optical filter 12 can be designed according to a plurality of requirements such as weight, cost and space requirements, depending e.g. on desired ambient wavelengths that are desired to be totally internally reflected.

When $\theta_c$ has been calculated from equation (3), then $\theta_2$ can be calculated by the relationship:

$$\theta_2 = 90° - \theta_3 \quad (5)$$

where $\theta_3$ is set equal to the critical angle $\theta_c$. The equation (2) can then be solved and it will be known which angles of the ambient light falling onto the top surface 6 that will be refracted by TIR on the second side 21 of the optical filter 12. By choosing a certain refractive index $n_f$ of the optical filter 12, the out-coupling arrangement 13 can thus be tuned to reflect and thus remove ambient light 22 incident on the second side 21 of the optical filter 12 in a certain interval, and thus ambient light 22 incident on the top surface 6 of the light guide 2 in a still further certain interval.

The relationship between $n_f$ and $\theta_1$ then can be formulated as:

$$\theta_1 = \sin^{-1}\left(\frac{n_g \cdot \sin(90° - \theta_3)}{n_a}\right) \quad (6)$$

If e.g. $n_f=1.22$ and $n_m=n_g=1.5$, the critical angle $\theta_c$ can be calculated with equation (3) to be 54.4°. Thus, all ambient light incident on the second side 21 of the optical filter 12 with an angle $\theta_3$ substantially between $54.4°<\theta_3<90°$ will be reflected by TIR and will not reach the detector 5. The angle $\theta_1$ of the ambient light can be calculated with equation (5) to be 60.8°. Thus, ambient light 22 incident with an angle $\theta_1$ to the normal of the top surface 6 that is smaller than 60.8° will not reach the detector 5. In the FIG. 3A ambient light 23 is also shown which has an angle to the normal of the top surface 6 that is larger than 60.8°, and therefore reaches the detector 5.

Light 24 from one or several emitters 4 is illustrated in the FIGS. 3A-3D as a dashed line 24 as it propagates in the light guide 2 by TIR. If na is 1 and $n_g$ is 1.5, then light 24 having an angle $\phi_1$ larger than a critical angle of 41° to the normal of the top surface 6 will be reflected by TIR. Thus, light 24 with an angle $\phi_1$ between approximately 41.1°-90° will be reflected by TIR in the light guide 2. The light 24 will be coupled out of the light guide 2 via the optical coupling medium 14, and be incident onto the second side 21 of the optical filter 12 with an angle to the normal of the second side 21 of the optical filter 12 that is smaller than the critical angle $\theta_c$ to the normal of the second side 21. The light 24 will then be refracted into the optical filter 12 and continue to the detector 5. With a careful design and placement of the mentioned components in relation to the surfaces 6, 7 of the light guide 2, the out-coupling arrangement 13 can be tuned to allow light 24 propagating in the light guide 2 to reach the detector 5, while filtering away a great amount of ambient light 22.

If it is desired that all ambient light incident on the top surface 6 shall be reflected by TIR on the second side 21 on the optical filter 12, then $\theta_1$ should be 90°. With the arrangement illustrated in FIG. 3A, the refractive index $n_f$ of the optical filter 12 then has to be about 1.1. Such a low refractive index $n_f$ of the optical filter 12 may be advantageous as has been previously described, as the penetration depth d of the evanescent waves becomes small and the width of the optical filter 12 then also can be small. However, an optical filter 12 with such a low index might be expensive because of the cost of the low refractive material. The out-coupling arrangement 13 may instead be further tuned by inclining the optical filter 12 with respect to the normal of the top surface 6. By inclining the optical filter 12 in a certain way, a larger interval of the angles of the incident ambient light can be reflected by TIR against the optical filter 12. The refractive index $n_f$ of the optical filter 12 can then be kept higher, e.g. between 1.2-1.5.

Further, if the refractive index $n_m$ of the optical coupling medium 14 is different from the refractive index $n_g$, e.g. greater or smaller, the angle of incident of the ambient light to the boundary between the light guide 2 and the optical coupling medium 14, i.e. the bottom surface 7 of the light guide 2, has to be calculated with Snell's law (1) by using $\theta_3$, $n_m$ and $n_g$. This calculated angle of incident can then be used instead of $\theta_3$ in equation (4) to calculate $\theta_2$.

In FIG. 3B an example is shown where the optical filter 12 and the detector 5 are inclined with an angle $\theta_4$ to the normal of the top surface 6. Thus, the second side 21 of the optical filter 12 is oriented with an angle $\theta_4$ to a normal of the top surface 6 of the light guide 2 such that the second side 21 faces away from the light guide 2. The critical angle $\theta_c$ is then:

$$\theta_c = \theta_3 + \theta_4 \quad (4)$$

Considering the case where all ambient light 22 shall be reflected and $\theta_1$ the is 90°. $\theta_2$ can be calculated with equation (2) to be 41.8°, and further $\theta_3$ with equation (4) to be 48.2°. As the critical angle $\theta_c$ still should be 54.4° as the refractive index $n_f$ is 1.22, then the inclination angle $\theta_4$ can be calculated with equation (6) to be 6.2°. Thus, if the refractive index $n_f$ is 1.22, then the optical filter 12 should be inclined 6.2° from the normal to the top surface 6 in a direction facing away from the light guide 2 to take away all ambient light 22. This means that ambient light 22 incident on the top surface 6 in substantially all angles can be prevented from reaching the detector 5. The detector 5 is here placed on a PCB 18 that is adapted to the inclination $\theta_4$ of the detector 5 and optical filter 12. The PCB 18 and the out-coupling arrangement 13 is further located a distance from the bottom side 7 of the light guide 2.

In FIG. 3C another example is illustrated, where the detector 5 is located a distance from the optical filter 12 leaving a gap between the detector 5 and the optical filter 12. The gap may be filled with the optical coupling medium 14. Light 24 that is propagating by TIR in the light guide 2 and is incident on the second side 21 of the optical filter 12 will then have to travel the distance before it reaches the detector 5, after it has been refracted from the first side 20 of the optical filter 12. The detector 5 should then be located in relation to the optical filter 12 such that the refracted incident light 24 will hit the active area of the detector 5. In the FIG. 3C ambient light 23 is also shown which has an angle to the normal of the top surface 6 that is larger than 60.8°, and in similarity with the embodiment illustrated in FIG. 3A therefore reaches the detector 5.

Figure 3D:
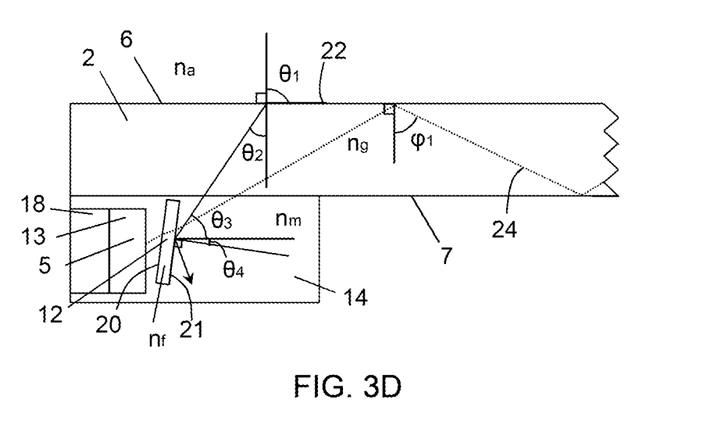

FIG. 3D is illustrating a further example of the light out-coupling arrangement 13, where the optical filter 12 is inclined as illustrated in FIG. 3B, but located a distance apart from the detector 5 in similarity with the embodiment in FIG. 3C. The detector 5 is arranged substantially perpendicular to the normal of the top surface 6. Also here the optical coupling medium 14 is filling the gap between the detector 5 and the optical filter 12. An advantage with this embodiment is that the detector 5 and the PCB 18 onto which the detector 5 is located do not have to be inclined with respect to the normal of the top surface 6 and/or bottom surface 7. A simplified attachment of the detector 5 and the PCB 18 to the light guide 2 may then be achieved.

Figure 4:
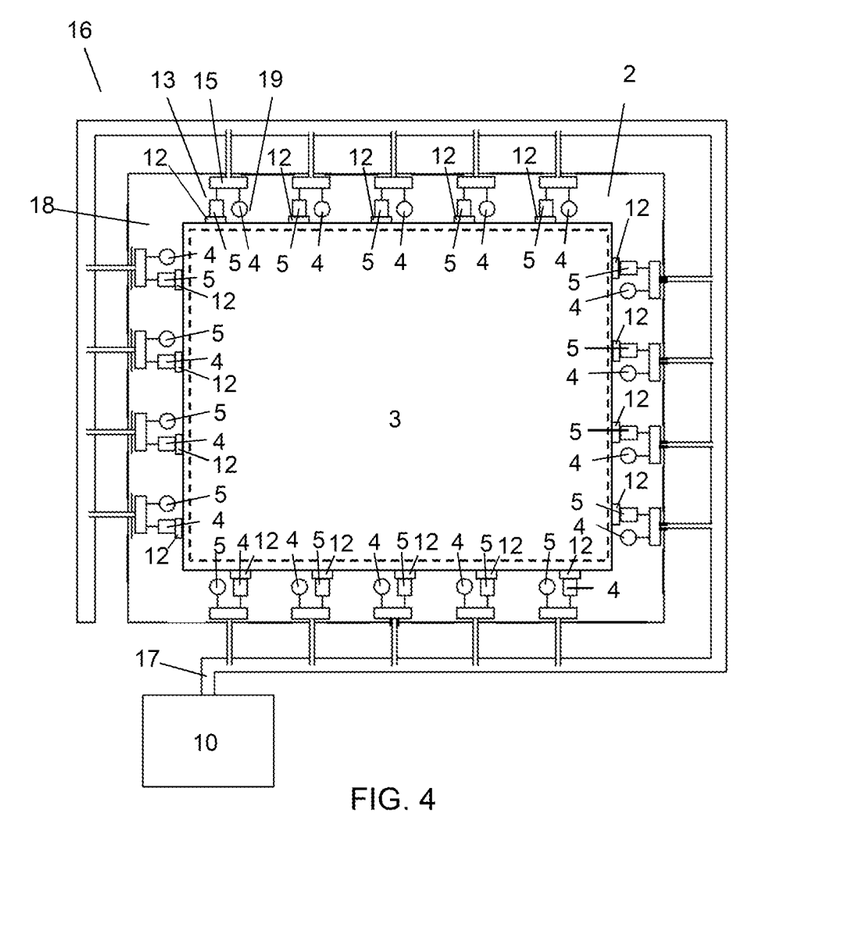
FIG. 4 illustrates a touch sensitive system according to some embodiments of the invention.

In FIG. 4 an example of a touch sensitive system 16 is illustrated. The in-coupling arrangement 19 here comprises a plurality of emitters 4 arranged along the periphery of the light guide 2 configured to emit light into the light guide 2 whereby the light propagates in the light guide 2 via total internal reflection (TIR). The touch sensitive system 16 further comprises an out-coupling arrangement 13 as has been previously described. The out-coupling arrangement 13 here comprises a plurality of detectors 5 and a plurality of optical filters 12. The detectors 5 and emitters 4 are each electrically connected to an integrated circuit 15. According to one embodiment, only one emitter 4 and one detector 5 is connected to each integrated circuit 15. The emitters 4 and detectors 5 of the system 16 should be connected to external electrical circuitry. The detectors 5, emitters 4 and integrated circuits 15 are integrated and electrically connected to the PCB 18. The system 16 further comprises the control unit 10 that is connected to one or several integrated circuits 15 via a buss 17, daisy chain or via other wired connection for e.g. communication and/or power. The integrated circuits 15 may be connected to the control unit 10 in series or in parallel. The integrated circuits 15 may be arranged to communicate via a local area network, e.g. a token ring network. The control unit 10 is configured to control operation of the components attached to the PCB 18. The control unit 10 is further configured to receive detection data from the detectors 5 via e.g. one or several signals, and to analyse the detection data to detect interaction with the touch surface 3. The touch sensitive system 16 is according to one embodiment based on Frustrated Total Internal Reflection, FTIR.

A screen or display may be integrated with the light guide 2, e.g. attached to the bottom surface 7 of the light guide 2. The PCB 18 is then preferably placed along the light guide 2 outside the extension of the screen or display.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A light out-coupling arrangement for a touch sensitive system, wherein the touch sensitive system comprises a light guide of a material with a refractive index $n_g$ and a top surface configured to be exposed to ambient light, and a bottom surface, the touch sensitive system further has an in-coupling arrangement comprising at least one emitter arranged along the periphery of the light guide and is configured to emit light into the light guide whereby the light propagates in the light guide via total internal reflection, TIR, wherein the out-coupling arrangement comprises
at least one detector arranged along the periphery of the light guide and configured to receive the light propagating in the light guide;
an optical filter provided between the light guide and the at least one detector, wherein the optical filter has a first side and a second side where the first side is arranged to face the at least one detector, and the second side is arranged to receive light from the light guide, the optical filter is further made of a medium with a refractive index $n_f$ less than the refractive index $n_g$ of the light guide, such that ambient light incident onto the second side with an angle larger than a critical angle $\theta_c$ from a normal of the second side, will be reflected on the optical filter by total internal reflection and will not reach the at least one detector.

2. The out-coupling arrangement according to claim 1, wherein the optical filter is made of a medium with a refractive index $n_f$ between 1 and 1.5.

3. The out-coupling arrangement according to claim 1, wherein the optical filter is arranged to reflect ambient light that is coupled out from the light guide through the lower surface of the light guide.

4. The out-coupling arrangement according to claim 1, wherein the optical filter is arranged to reflect ambient light that is coupled out from the light guide through an edge of the light guide.

5. The out-coupling arrangement according to claim 1, wherein the second side of the optical filter is oriented in relation to the light guide such that ambient light incident on the top surface of the light guide is incident on the second side with an angle larger than the critical angle $\theta_c$ from a normal of the second side and thus reflected by total internal reflection.

6. The out-coupling arrangement according to claim 5, wherein the second side of the optical filter is oriented with an angle $\theta_4$ to a normal of the top surface of the light guide such that the second side faces away from the light guide.

7. The out-coupling arrangement according to claim 5, wherein the second side of the optical filter is oriented in a direction substantially perpendicular to the top surface of the light guide.

8. The out-coupling arrangement according to claim 1, wherein the optical filter has a width between the first side and the second side of at least 1 μm.

9. The out-coupling arrangement according to claim 1, wherein the optical filter is a tape.

10. The out-coupling arrangement according to claim 1, wherein the optical filter is a coating.

11. The out-coupling arrangement according to claim 1, wherein the medium of the optical filter is air.

12. The out-coupling arrangement according to claim 1, wherein the medium of the optical filter is a fluid.

13. A touch sensitive system comprising
   a light guide having a top surface and a bottom surface;
   an in-coupling arrangement comprising at least one emitter arranged along the periphery of the light guide and configured to emit light into the light guide whereby the light propagates in the light guide via Total Internal Reflection, TIR, wherein the touch sensitive system further comprises an out-coupling arrangement according to claim 1.

* * * * *